United States Patent
Duffy et al.

(10) Patent No.: US 9,043,749 B2
(45) Date of Patent: May 26, 2015

(54) UNIFIED AND EXTENSIBLE ASYNCHRONOUS AND SYNCHRONOUS CANCELATION

(75) Inventors: Joe Duffy, Renton, WA (US); Stephen Toub, Seattle, WA (US); Brian Grunkemeyer, Redmond, WA (US); Ramasamy Krishnaswamy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1733 days.

(21) Appl. No.: 12/139,515

(22) Filed: Jun. 16, 2008

(65) Prior Publication Data

US 2009/0313624 A1    Dec. 17, 2009

(51) Int. Cl.
*G06F 9/44* (2006.01)
*G06F 9/46* (2006.01)

(52) U.S. Cl.
CPC ...................... *G06F 9/466* (2013.01)

(58) Field of Classification Search
None
See application file for complete search history.

(56) References Cited

U.S. PATENT DOCUMENTS

| | | |
|---|---|---|
| 5,432,933 A | 7/1995 | Janicek |
| 5,890,127 A | 3/1999 | Buzsaki |
| 7,233,972 B2 | 6/2007 | Minow |
| 2004/0215650 A1 | 10/2004 | Shaji et al. |
| 2006/0212877 A1* | 9/2006 | Grunkemeyer et al. ...... 719/313 |
| 2006/0256797 A1* | 11/2006 | Bernabeu-Auban et al. ............ 370/395.31 |
| 2007/0239498 A1 | 10/2007 | Shukla et al. |
| 2007/0256075 A1 | 11/2007 | Denis |

OTHER PUBLICATIONS

"CancellationRegion", http://labs.developerfusion.co.uk/SourceViewer/view/SSCLI/System.Threading/CancellationRegion/.
"Killing Asynchronous Calls", https://forums.microsoft.com/MSDN/ShowPost.aspx?PostID=71738&SiteID=1.
"Generic, Cancellable, Asynchronous operations?", http://weblogs.asp.net/justin_rogers/archive/2004/05/22/139649.aspx.
"Clean and Quick Cancellation of I/O Operations", http://www.codeproject.com/KB/vista/CleanCencellOs.aspx.
"Synchronous and Asynchronous I/O", http://msdn2.microsoft.com/en-us/library/aa365683(VS.85).aspx.

* cited by examiner

*Primary Examiner* — Qamrun Nahar
(74) *Attorney, Agent, or Firm* — Kevin Sullivan; Kate Drakos; Micky Minhas

(57) ABSTRACT

A cancelation registry provides a cancelation interface whose implementation registers cancelable items such as synchronous operations, asynchronous operations, type instances, and transactions. Items may be implicitly or explicitly registered with the cancelation registry. A consistent cancelation interface unifies cancelation management for heterogeneous items, and allows cancelation of a group of items with a single invocation of a cancel-registered-items procedure.

20 Claims, 2 Drawing Sheets

UNIFIED AND EXTENSIBLE ASYNCHRONOUS AND SYNCHRONOUS CANCELATION

BACKGROUND

Many operations in computer systems support the notion of cancelation in one form or another. For example, a request to download a Web page could be canceled such that no further requests for data are issued and no more data is retrieved. A database transaction could be canceled, resulting in the transaction being rolled back. A synchronization barrier could be canceled, such that any threads waiting on the barrier would wake up and any future waits would be satisfied immediately. Other specific examples abound.

An abrupt termination of operations due to loss of electric power or severe hardware failure can stop multiple operations, but such a termination is not the same as a cancelation of the operations. Cancelation involves at least attempting to end each operation in a clean manner, by releasing memory and other resources claimed by the operation, updating logs, posting error messages or other user updates, notifying cooperating threads or processes of the operation's termination, closing open communication channels, and so on. Each type of operation will generally have specific goals to be accomplished as part of being canceled. Thus, canceling an I/O request differs from canceling a synchronization primitive, and so on.

SUMMARY

In some embodiments, a cancelation interface provides an add-to-cancelation-registry procedure for adding a cancelable item to a cancelation registry, and also provides a cancel-registered-items procedure for attempting to cancel items that are registered with the cancelation registry. Registered cancelable items may include a wide variety of objects and operations, such as one or more synchronous operations, asynchronous operations, I/O operations, transactional operations, parallel operations, sequential operations, application program operations, kernel operations, objects which publish cancelable operations, and other items. In some embodiments, all of the registered items can be canceled by a single invocation of the cancel-registered-items procedure.

In some embodiments, some items which were not explicitly registered with the cancelation registry are implicitly registered. In some embodiments, items not registered with the cancelation registry can monitor the cancelation registry and respond to an invocation of the cancel-registered-items procedure.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
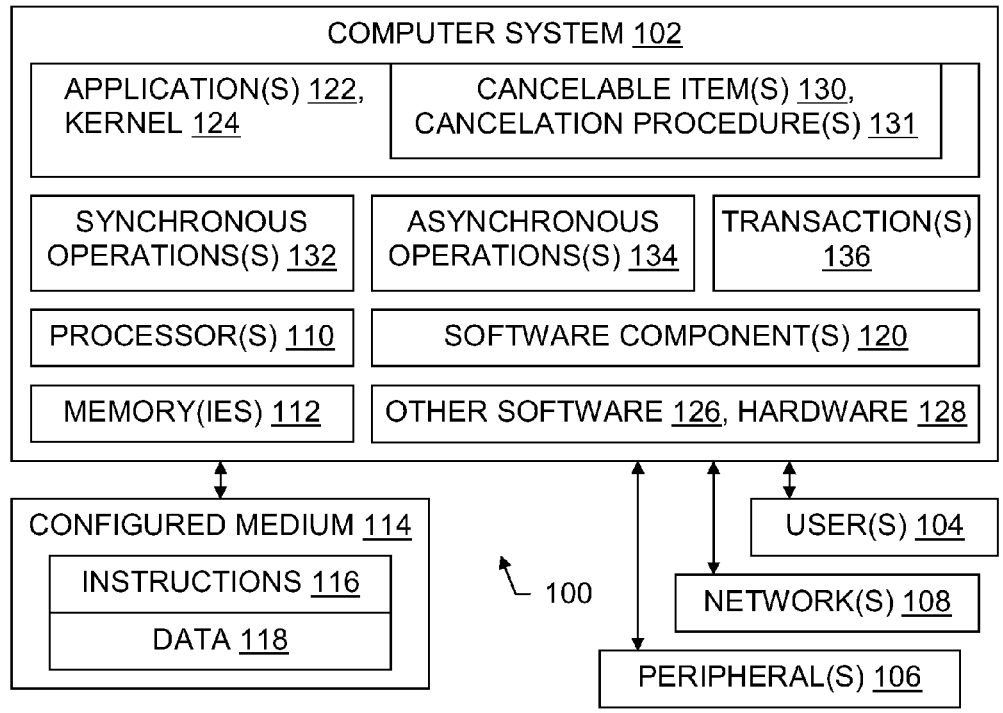
FIG. 1 is a block diagram illustrating a computer system in an operating environment, and configured storage medium embodiments.

Many operations in computer systems are (or should be) subject to cancelation in one form or another. Each type of operation will generally have specific goals to be accomplished as part of being canceled; canceling an I/O request differs from canceling a synchronization primitive, and so on. However, there is inadequate support for consistent handling of cancelation in major programming frameworks. For example, there is apparently no consistent and established mechanism in the Microsoft .NET Framework that a developer can use to easily cancel, in a single step, both an I/O request and a synchronization primitive.

One approach would have provided a CancelationRegion construct, allowing a developer to write code such as:

```
using (CancelationRegion cr = new CancelationRegion( ))
{
    FileStream fs = ...;
    fs.BeginWrite(...);
    ...
    if (...) cr.Cancel( );
}
```

This approach would allow the developer to bundle up all cancelable activities into one region that could then be canceled in one shot, without needing to worry about or understand the individual (and sometimes proprietary) cancelation mechanisms of all the types used inside the cancelation region.

However, the CancelationRegion approach is flawed because the underlying design is fundamentally an injection model, tied to a particular scope. Injection is dangerous for much the same reason that interruption is dangerous, namely, it changes the behavior of code in ways that may not have been foreseen by other code that relies on the code whose behavior has changed.

Injection significantly hinders composability. To avoid problems from unexpected new behavior, all code called within a CancelationRegion, including library functions from third parties, would need to have been written with CancelationRegion cancelation in mind. For example, all library code called within the CancelationRegion scope would automatically be enlisted in a CancelationRegion present at the time of the call into the library, and would need to have been designed accordingly, including some well-defined semantics on when the cancellation occurs.

Some embodiments described herein provide a different approach, namely, a cancelation registry approach. A cancelation registry provides a cancelation mechanism which, like a CancelationRegion, can be unified across an entire framework. Unlike a CancelationRegion, however, the cancelation registry provides an opt-in model, thereby avoiding problems arising from injection. As an added benefit, in some embodiments the cancelation registry mechanism supports both synchronous and asynchronous operations, in contrast with the CancelationRegion approach, which only supported asynchronous cancelation.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

Whenever reference is made to data or instructions, it is understood that these items configure a computer-readable memory, as opposed to simply existing on paper, in a programmer's mind, or as a transitory signal on a wire, for example.

Operating Environments

With reference to FIG. 1, an operating environment 100 for an embodiment may include, for instance, a computer system 102, which may be multithreaded or not, and multiprocessor or not. An operating environment may include one or more computer systems, which may be clustered, client-server networked, and/or peer-to-peer networked. Some operating environments include a stand-alone (non-networked) computer system.

Human users 104 may interact with the computer system 102 or with another computer system in an embodiment by using screens, keyboards, and other peripherals 106. A software developer is understood to be a particular type of user 104; end-users are also considered users 104. Storage devices and/or networking devices may be considered peripheral equipment in some embodiments. Other computer systems (not shown) may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system 102 when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. For clarity of illustration, memories 112 are shown in a single block in FIG. 1, but it will be understood that memories may be of different physical types, and that applications 122 and other items shown in the Figures may reside partially or entirely within one or more memories 112, thereby configuring those memories.

In a given operating environment, the computer system 102 or another computer system may be configured with and/or run one or more software components 120 such as library files, public interfaces, class instantiations, drivers, and interrupt handlers; one or more applications 122; one or more operating systems, hypervisors, or other kernels 124; and other software 126. Hardware 128 other than that already enumerated may also be present.

The software configuring a computer system may include code for performing synchronous operations 132, asynchronous operations 134, and/or transactions 136, for example. Any of the things denoted at 120, 132, 134, 136, may be cancelable items 130. More generally, cancelable items 130 may include cancelable operations or cancelable type instances, for example. Cancelation of a given cancelable item may be accomplished using a cancelation procedure 131, which is typically specific to the kind of item 130 being canceled. Code may be referred to herein for convenience by the name of the capability it provides, e.g., "code for performing asynchronous operations 134" may also be referred to herein simply as "asynchronous operations 134", or as "code" or "software" or "instructions".

Some of the suitable operating environments for some embodiments include the Microsoft® .NET™ environment (marks of Microsoft Corporation). Some suitable operating environments include Java® environments (mark of Sun Microsystems, Inc.), and some include environments which utilize languages such as C++ or C# ("C-Sharp").

Systems

Figure 2:
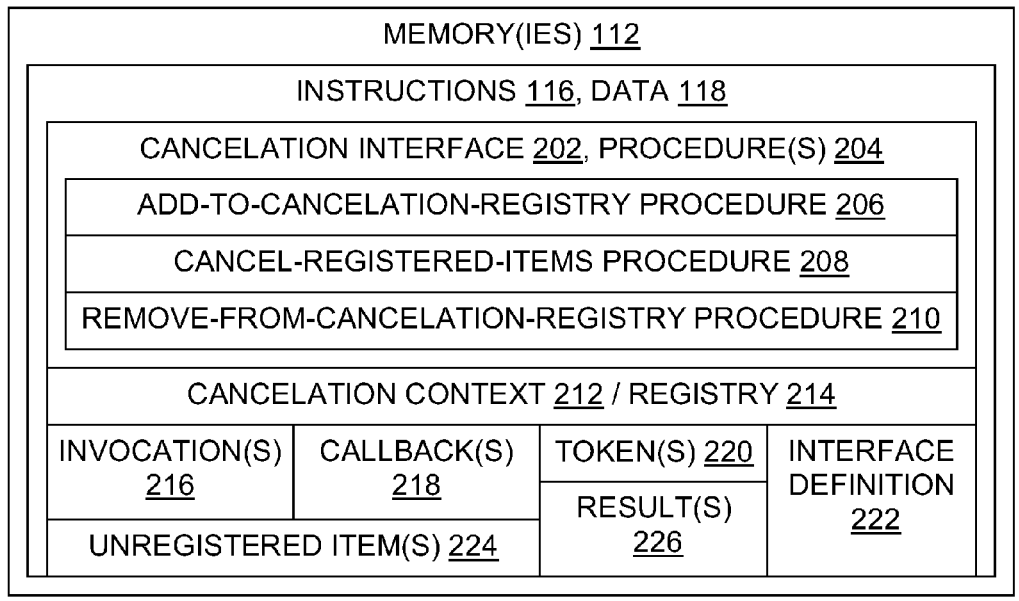
FIG. 2 is a block diagram further illustrating a computer system memory configured with a cancelation interface, a cancelation registry, and other things related to cancelation.

Referring now to FIGS. 1 and 2, some embodiments include a computer system 102 configured with a cancelation interface 202, one or more procedures 204 which implement the interface 202, and a cancelation registry 214. The cancelation interface 202 and the procedures 204 which provide access to the cancelation registry 214 may be provided as a software component 120 or as a programming language feature, for example.

In the illustrated configuration, the interface procedures 204 include an add-to-cancelation-registry procedure 206 for adding an item to the cancelation registry 214, a remove-from-cancelation-registry procedure 210 for removing an item from the cancelation registry 214, and a cancel-registered-items procedure 208 for attempting to cancel all items presently registered in the cancelation registry 214. Some embodiments lack the remove-from-cancelation-registry procedure 210.

Before exploring the remainder of FIG. 2, we consider an example in the Microsoft .NET Framework. In a computer system 102 configured with the .NET Framework, operations 134 that operate asynchronously and that follow the Asynchronous Programming Model (APM) pattern return an IAsyncResult instance. Applications 122 and other programs using IAsyncResult can wait on the operation to complete, can poll for its completion, and so forth. However, a general mechanism is not provided in APM for canceling an asynchronous operation.

Consistent with the teachings herein, we introduce a new interface 202 ICancelableAsyncResult, which derives from IAsyncResult and provides a Cancel operation as a cancel-registered-items procedure 208:

```
public interface ICancelableAsyncResult :
IAsyncResult
{
    void Cancel( );
}
```

Existing APIs that return objects that implement IAsyncResult may be updated consistent with the teachings herein to instead implement ICancelableAsyncResult, providing an implementation of the Cancel method suitable to whatever the cancelable operation may be.

These changes will allow many .NET Framework components to support cancelation in a consistent manner. For example, client code can be handed an ICancelableAsyncResult interface 202, and if the client calls cancel on that interface then the instance will be canceled using whatever routine the instance developer considered appropriate.

Unfortunately, the approach just described would not work well with the Event-Based Asynchronous Pattern (EAP) component model introduced along with the .NET Framework 2.0. The APM is focused on individual asynchronous operations, and thus ICancelableAsyncResult is relevant to each of those individual operations. In contrast, the EAP is focused on an entire component rather than on particular operations. Under EAP, asynchronous operations 134 are launched by calling methods named XxAsync (e.g. DownloadAsync, RunAsync), which typically return void rather than a handle to the work item. All outstanding operations are canceled with a call to CancelAsync, although some implementations choose to allow individual operations to be canceled by associating a user-state token with a request, and then passing that same request to an overload of CancelAsync. In view of all this, ICancelableAsyncResult will not adequately support types that follow the EAP. Instead, we provide an additional interface 202:

```
public interface ISupportsCancelation
{
    void CancelAsync( );
}
```

A type that wants to be consistent with the EAP platform's new cancelation interface 202 can implement ISupportsCancelation.

The two interfaces can be unified by having ICancelableAsyncResult also implement ISupportsCancelation, assuming that an implementation of ICancelableAsyncResult and ISupportsCancelation would typically perform the same actions in response to both Cancel and CancelAsync:

```
public interface ICancelableAsyncResult :
ISupportsCancelation, IAsyncResult
{
    void Cancel( );
}
```

With the foregoing modifications made, a client could simply query for ISupportsCancelation on either an EAP component that issues asynchronous operations or on the result of an individual APM asynchronous operation, and then cancel the operation using the same API, regardless of the underlying implementation.

Modifications to support cancelation can be taken further. We introduce a CancelationContext type that tracks groups of logically-related cancelable operations:

```
public class CancelationContext :
ISupportsCancelation, IDisposable
{
    public void Add(ISupportsCancelation
    cancelableOperation);
    public void Remove(ISupportsCancelation
```

```
        cancelableOperation);
    public void Cancel( );
    public bool IsCanceled { get; }
    public EventWaitHandle CancelationEvent { get; }
}
```

Public class CancelationContext is an example of a cancelation interface 202. CancelationContext.Add( ), CancelationContext.Remove( ), and CancelationContext.Cancel( ) are examples of an add-to-cancelation-registry procedure 206, a remove-from-cancelation-registry procedure 210, and a cancel-registered-items procedure 208, respectively. A list (or other data structure) of items 130 and corresponding cancelation procedures 131 may be used to implement a cancelation registry 214 in connection with bodies for these procedures 204, 206, 208. In one embodiment, the Add( ) procedure adds an item 130 and corresponding procedure 131 to the list (for instance) of registered items; the Remove( ) procedure removes an item 130 and its procedure 131 from the list; and the Cancel( ) procedure traverses the list and invokes each item's cancelation procedure 131.

In some embodiments, calling CancelationContext.Cancel( ) goes through all registered operations 132, 134 and cancels them, using ISupportsCancelation.Cancel, sets the IsCanceled flag, and signals the CancelationEvent. Synchronous invocations of Cancel, i.e. invocations where Cancel doesn't return until all operations have completed cancelation, can be achieved through callback mechanisms on CancelationContext, where each canceled operation calls back to CancelationContext to alert the registry of the completed cancelation.

CancelationContext can be used for canceling both asynchronous operations 134 and synchronous operations 132. If an ISupportsCancelation object represents an asynchronous operation, a developer simply adds the object to the cancelation registry 214 associated with CancelationContext. When CancelationContext.Cancel is called, it cancels all previously registered operations. This enables a user to aggregate a set of heterogeneous cancelable objects that are related, and later cancel them all in one place. An instance could have multiple pending asynchronous operations, and canceling that instance could cancel all of those outstanding operations.

Synchronous cancelable operations could be adapted to accept a CancelationContext in their parameter list. Internally, the synchronous operation would do whatever is necessary to get notified of the cancelation operation. For instance, FileStream.Read(byte[], int, int, CancelationContext) would register its own ISupportsCancelation with the CancelationContext object that simply did a CancelSynchronousIo from within the Cancel method, which would interrupt the thread blocked on the file handle and cause an IoCanceledException to be thrown. In one configuration, CancelSynchronousIO takes in a handle to a thread, not a handle to a file or any other synchronization primitive. As a result, the CancelationContext would not need to be passed in as a parameter to FileStream.Read; noticecould be passed outside of the class several levels up the stack without knowledge of the individual APIs per se. As another example, CancelIoEx does take a file handle, although it cancels every IO request on that file handle from any thread in the process, which may not be desired. In short, a developer may identify competing and less-than-optimal implementations within a given environment, whether it be a Microsoft Windows® environment or some other operating system environment.

All of the design considerations and other teachings herein may be considered during the design and implementation of cancelation registries.

Note that CancelationContext itself implements ISupportsCancelation. This implementation allows for nesting scenarios, where groups of cancelation contexts can be canceled with ease by canceling the outermost cancelation context.

More generally, some embodiments provide a computer system 102 configured for cancelation of registered operations. The system includes at least one memory 112 configured with executable instructions 116 of a program, and at least one logical processor 110 configured to execute at least a portion of the instructions. The system also includes a cancelation interface 202, such as CancelationContext, which configures the memory 112. The cancelation interface 202 includes at least an add-to-cancelation-registry procedure 206 for adding a cancelable operation to a cancelation registry 214, and a cancel-registered-items procedure 208 for attempting to cancel operation(s) that are registered with the cancelation registry. The program includes an invocation 216 of the cancel-registered-items 208 procedure. In some embodiments the cancelation interface includes a remove-from-cancelation-registry procedure 210 for ensuring that an operation is not registered in the cancelation registry; the remove-from-cancelation-registry procedure 210 removes an operation or other item from the registry, if the item was registered.

In some embodiments, the invocation 216 of the add-to-cancelation-registry procedure 206 is configured to create a cancelation token 220 within the program. The instructions 116 are also configured to pass the cancelation token to each registered synchronous operation 132 in response to an invocation 216 of the cancel-registered-items procedure 208. The token 220 may be passed sequentially, or the token may be passed in a parallel manner, such as:

```
    foreach(var cancelableOp in ops)
    {
        cancelableOp.Cancel( );
    }
    // Or to all registered operations concurrently:
    Parallel.For(ops, cancelableOp =>
    {
        cancelableOp.Cancel( );
    });
```

An interface 202 for a cancelation registry 214 may provide both a way to specify a token 220 for synchronous operations and a way to aggregate cancelable operations and then issue with a single invocation a cancelation for many (if not all) of the cancelable operations. However, tokens 220 and group cancelation are independent features, each of which may also appear without the other in a given embodiment.

The cancelation registry 214 may follow different scoping rules in different embodiments. In some embodiments, the cancelation registry 214 satisfies at least one of the following conditions: the cancelation registry follows program language scope rules, the cancelation registry is freeflowing within the program, the cancelation registry is stored in a thread's local memory, the cancelation registry is stored in a static variable, the cancelation registry is communicated via message passing. In some programs, the cancelation registry 214 is a component 120 which can be passed in an ad hoc manner between other components in the program. In some embodiments, the cancelation registry can be flowed from thread to thread at async points, e.g.:

```
   ... // assume the cancelation context is active here
   new Thread(delegate
   {
       ... // the same context was flowed to this new thread such
       // that operations on this thread can be implicitly or
       // explicitly registered with that cancelation context
   }).Start( );
```

A cancelation context 212 is a cancelation registry 214 which has thread affinity and is marshaled across async points. Using "context" to name particular registries 214 is consistent with the "context" naming convention used in Microsoft's .NET Framework for other context types.

Some embodiments include an ambient cancelation context 212 which implicitly registers items 130 and corresponding cancelation procedures 131 that come within its scope. In some embodiments, items 130 may also be explicitly registered with the ambient cancelation context 212. Some embodiments similarly provide an ambient cancelation registry 214 which also supports explicit registration.

If a cancelation registry 214 is used in an ambient manner, operations and their corresponding cancelation procedures 131 are implicitly registered with the registry for operations that occur while the registry is active, that is, within the registry's scope. A cancelation registry 214 can also be used with explicitly registered operations and cancelation procedures. A cancelation registry 214 can also be explicitly provided to type instances and other components 120 so that those components 120 can explicitly register with the registry operations being executed by those components.

In some embodiments, operation cancelation procedures 131 can make callbacks 218 to a cancelation registry 214 to alert the cancelation registry 214 to their completion. An application 122 can then register with the cancelation registry 214 to be notified when specified cancelation procedures 131 have completed processing.

Some embodiments include more than one cancelation registry 214. For example, one embodiment includes a first cancelation registry 214 configuring the memory 112 and a second cancelation registry 214 also configuring the memory 112. The program in the system 102 includes a first context having a first cancel-registered-items procedure invocation 216 for attempting to cancel a first group of items 130 that are registered with the first cancelation registry, and a second context having a second cancel-registered-items procedure invocation 216 for attempting to cancel a second group of items 130 that are registered with the second cancelation registry. The registries are not identical, that is, at least one item 130 is registered in one of the cancelation registries but is not registered in the other cancelation registry. In short, the system is configured with two cancelation registries, which are not necessarily nested in scope but could be nested or otherwise overlap in some cases.

In some embodiments, the cancelation interface 202 is presented in the program by an interface definition 222. The interface definition 222 may include a C-Sharp class or a C-Sharp interface, for example. More generally, the interface definition 222 may be present in embodiments written in C-Sharp, Java, or other languages that have class or interface programming constructs.

The interface definition 222 may contain one or more procedure headings for procedures 204. The term "procedure" in FIG. 2 denotes procedures which can be invoked, and due to limited space in the Figure "procedure" also denotes procedure headings for the identified procedures. Depending on whether a discussion includes execution of procedures 204, interface 202 may be viewed either as a set of procedure headings or as a set of routines which can be called through invocations consistent with those procedure headings.

Procedure headings may be implemented as method signatures, type signatures, procedure specifications, method declarations, or the like. Procedure headings provide information such as the name of a function or other software routine, the parameters expected by the routine, and the value if any returned by the routine.

The interface definition 222, and cancelation interfaces 202 generally, may include variables. Likewise, variables may be used in addition to, or in place of, procedure headings for procedures 206, 208, 210 in some embodiments. However, in a language such as C-Sharp or Java, keeping the cancelation interface 202 free of assumptions about any cancelation procedure's specific mechanism may be accomplished most easily in some cases by using procedure headings rather than using other approaches.

Program code examples given herein do not describe all possible embodiments. Embodiments are not limited to the specific program code provided herein. A given embodiment may include additional program code, different program code, code written in a different programming language, and/or otherwise depart from the examples provided.

In some embodiments, peripheral equipment such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Some embodiments include a configured computer-readable storage medium 114, which is an example of a memory 112. Memory 112 may include disks (magnetic, optical, or otherwise), RAM, EEPROMS or other ROMs, and/or other configurable memory. A general-purpose memory 112, which may be removable or not, and may be volatile or not, can be configured into an embodiment using components such as a cancelation interface 202 and procedures 204, in the form of corresponding data 118 and instructions 116, read from a removable medium 114 and/or another source such as a network connection, to thereby form a configured medium in the form of configured memory 112 which is capable of causing a computer system to perform method steps for configuring software and/or for providing cancelation capabilities as disclosed herein. FIGS. 1 and 2 thus help illustrate configured storage media embodiments and method embodiments, as well as system embodiments.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Methods Overview

Figure 3:
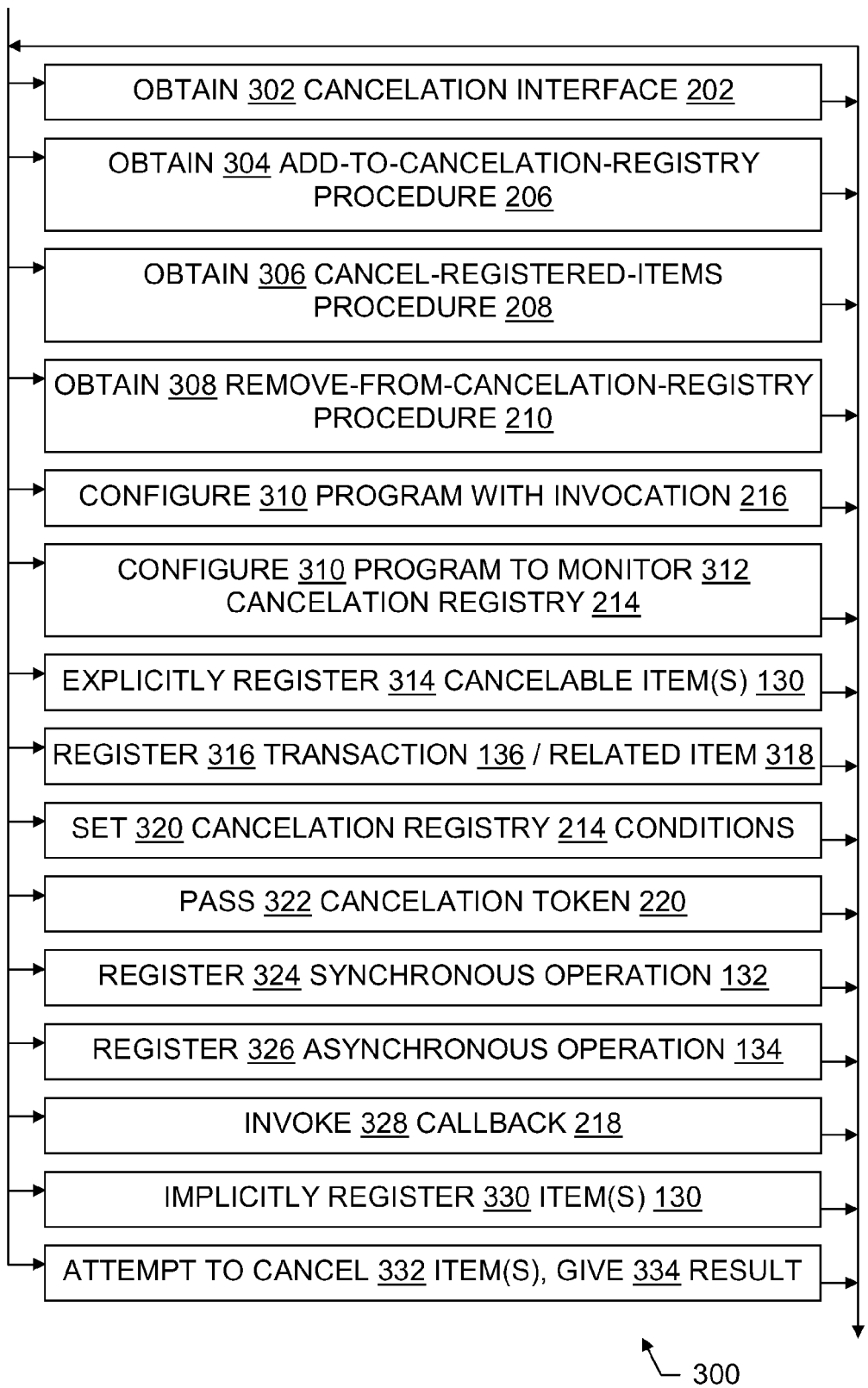
FIG. 3 is a flow chart illustrating steps of some method and configured storage medium embodiments.

FIG. 3 illustrates some method embodiments in a flowchart 300. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a cancelation interface obtaining step 302, a software developer (or code acting on behalf of a developer) obtains a cancelation interface 202, such as ICancelableAsyncResult, ISupportsCancelation, or CancelationContext, for example. Obtaining step 302 may be accomplished by including a file containing code which implements the cancelation interface 202, by linking such a file, by loading such a file, or by any mechanism for bringing software capabilities into an environment or into a particular program.

During an add procedure obtaining step 304, a developer or an environment obtains at least a procedure heading for an add-to-cancelation-registry procedure 206, such as CancelationContext.Add( ), for example. In practice, the developer will often also obtain 304 a procedure body implementing the add-to-cancelation-registry procedure heading.

During a cancel procedure obtaining step 306, a developer or an environment obtains at least a procedure heading for a cancel-registered-items procedure 208, such as CancelationContext.Cancel( ), for example. In practice, the developer will often also obtain 306 a procedure body implementing the cancel-registered-items procedure heading.

During a remove procedure obtaining step 308, a developer or an environment obtains at least a procedure heading for a remove-from-cancelation-registry procedure 210, such as CancelationContext.Remove( ), for example. In practice, the developer will often also obtain 308 a procedure body implementing the remove-from-cancelation-registry procedure heading.

Obtaining steps 304, 306, 308 may partially or fully coincide with interface obtaining step 302, but it will also be appreciated that by obtaining 302 a cancelation interface 202 one may in some cases thereby obtain one or more procedure headings and procedure bodies.

During a program invocation configuring step 310, software is configured with one or more procedure invocations 216. The software may be configured to invoke one of the cancelation interface procedures 204, 206, 208, for example.

During a program monitor configuring step 312, software is configured to monitor one or more registered cancelable items 130. The software may be configured to monitor 312 a registered I/O operation, for example, so that cancelation of the I/O operation will lead to notification of a component 120 which may then cancel unregistered cancelable items 224 related to the registered I/O operation. It is possible that by such a domino effect synchronous operations and/or asynchronous operations could take part in a group cancelation even if they are not registered with the cancelation registry as part of the group of items being canceled.

During an explicit registering step 314, a cancelable item 130 is explicitly registered with a cancelation registry 214 via an invocation 216 of a published routine such as an add-to-cancelation-registry procedure 206. Unless otherwise indicated, registration of a cancelable item 130 includes registration or identification of at least one cancelation procedure 131 for the item 130 being registered, whether registration is explicit or implicit.

During a transaction registering step 316, a transaction 136 is registered with a cancelation registry 214; transactions are cancelable items 130 in some embodiments. During a transaction-related-item registering step 318, an item 130 related to a transaction 136, such as an I/O operation, is registered with a cancelation registry 214. As with other registrations, registering steps 316, 318 may be explicit or implicit except as otherwise indicated herein. A cancelation registry 214 can be integrated with a transactional framework, such as a database management system, so that operations can be automatically canceled when a transaction 136 is rolled back.

During a cancelation registry scope condition setting step 320, conditions are set to influence or define the scope of a cancelation registry 214. Scope conditions may be inherent in a given programming language or programming model, or a developer may be given a choice between different cancelation registry scopes. For example, conditions may specify that the cancelation registry follow program language scope rules, that the registry be freeflowing within a program, that the registry be stored in a particular memory 112 such as a thread's local memory, or that the cancelation registry flow from thread to thread at async points.

During a cancelation token passing step 322, at least one cancelation token 220 is passed to at least one registered cancelable item 130 by an implementation of the cancel-registered-items procedure 208, thereby requesting or compelling the item(s) 130 receiving the token 220 to undergo cancelation according to the specific cancelation procedure 131 instructions 116 deemed suitable by the developer(s) of those items 130.

During a synchronous operation registering step 324, a synchronous operation is explicitly or implicitly registered with a cancelation registry 214.

During an asynchronous operation registering step 326, an asynchronous operation is explicitly or implicitly registered with a cancelation registry 214. A cancel-registered-items procedure 208 itself may have a synchronous or an asynchronous calling convention, a feature which is orthogonal to the fact that an item 130 being canceled may have a synchronous or an asynchronous calling convention, e.g., may not have completed cancelation by the time the cancel-registered-items procedure 208 returns.

For example, Cancel( ) can be synchronous in that it could wait for all items 130 to acknowledge a cancelation request or to signal that they've completed whatever they were doing, namely, to signal that they have either ignored the cancelation request and completed successfully or that they stopped due to the cancelation request. If an operation is canceled and throws an exception, an event may be provided for signaling that event. In some embodiments, an ISupports Cancelation.IsCanceled property is set. Another option can be described as "I acknowledge that you've requested cancelation, and I never plan to tell you what happened." This approach could be accomplished with the ISupportsCancelation.Cancel method returning a status code, e.g.,:

```
    enum CancelStatus
{
    Completed,              // completed synchronously during the call
                            //to Cancel
    WillReportCompletion,   // asynchronous cancelation,
                            // but will call back to the
                            // context when cancelation is
                            // done
    WillNotReportCompletion // asynchronous cancelation
                            // and will not report back
                            // to the context
}
```

The CancelationContext will know after calling each ISupportsCancelation's Cancel method whether all methods have completed, and if they have not complete will know which methods to wait for, that is, which methods will send an alert when they are done. Of course, a component could lie or be mistaken by returning WillReportCompletion and then not doing so. The callback could happen in a variety of ways. For example, ISupportsCancelation.Cancel could accept a delegate to be called when cancelation was complete; that delegate would inform the CancelationContext which ISupportsCancelation completed.

Cancel( ) can be asynchronous if it simply returns after asking each of the registered items 130 to cancel themselves, without waiting to hear anything back about the success of the requested cancelation.

A registered operation could be an asynchronous operation, e.g.:

```
            var asyncResult = file.BeginRead( );
        ... // the operation is running asynchronously
        cancelationContext.Add(asyncResult);
```

Or the registered operation could be a synchronous operation, e.g.
file.Read(cancelationcontext);

In the foregoing example a cancelation registry 214 cancelationContext is being passed in to the Read method. Internally the Read method can then monitor cancelationContext watching for a cancelation request to be issued. The Read method is synchronous and will only return when it has completed, either due to running to completion or stopping early due to a cancelation attempt.

Notice that the Read method may not be invoking an add-to-cancelation-registry procedure 206 to add Read to the cancelation registry 214, although in some cases items 130 may register themselves. Rather, the Read method may just be monitoring 312 the registry 214 to see when the Read has been canceled, and then take action to stop the synchronous operation. In other words, synchronous operations 132 might not be explicitly registered. The same could theoretically occur with asynchronous operations 134.

During a callback invoking step 328, a callback 218 routine associated with a registered item 130 is invoked.

During an implicit registering step 330, a cancelable item 130 is implicitly registered with a cancelation registry 214, that is, without a use by the registered item 130 of an invocation 216 of a published registration routine such as an add-to-cancelation-registry procedure 206.

During a cancelation attempting step 332, at least one attempt is made to cancel at least one item 130 that is registered with a cancelation registry 214 by invoking the item's cancelation procedure 131. The item 130 being canceled may be an I/O operation, for example, or another operation, or a type instance, or a transaction 136. A result 226 of the cancelation attempt is then given 334 to the code that registered the item 130.

Some embodiments provide a method which may be used by a software developer to configure cancelation of operations in a program. The method includes obtaining 302 a cancelation interface 202 which includes an add-to-cancelation-registry procedure 206 for adding a cancelable item 130 to a cancelation registry 214, and which also includes a cancel-registered-items procedure 208 for attempting to cancel item(s) 130 that are registered with the cancelation registry. The method also includes configuring 310 the program with an invocation 216 of the add-to-cancelation-registry procedure 206, thereby allowing registration of a cancelable item 130 in the cancelation registry 214.

In some embodiments, the method further includes configuring 310 the program for a cancelable item 130 to monitor 312 the cancelation registry 214 without the cancelable item 130 in question being registered in the cancelation registry. The method also configures 310 the program to cancel 332 the cancelable item 130 in question, but to do so in response to cancelation of a different cancelable item 130 which is registered in the cancelation registry. That is, in some embodiments, cancelation of a registered item 130 can lead in a domino effect to cancelation of an unregistered cancelable item 224 due to monitoring 312 of the cancelation registry 214.

In some embodiments, the method further includes configuring 310 the program with at least one of the following: an invocation 216 of the add-to-cancelation-registry procedure 206 to register an item 130 that is associated with a transaction 136 framework; an invocation 216 of the add-to-cancelation-registry procedure 206 to register a transaction 136. In some embodiments, the semantics of cancelation and the semantics of transaction have similar characteristics but differ in their respective inherent post operation guarantees. Cancelation provides fail-fast semantics while transaction rollback provides fail-safe semantics so transactional data integrity will not be compromised. These semantics can be intertwined but implementation specifics may differ.

In some embodiments, the cancel-registered-items procedure 208 is an asynchronous procedure, and the method further includes configuring 310 the program with an invocation 216 of the asynchronous cancel-registered-items procedure 208. In some embodiments, the cancel-registered-items procedure 208 is a synchronous procedure, and the method further includes configuring 310 the program with an invocation 216 of the synchronous cancel-registered-items procedure 208 in coordination with a thread blocking operation. In some embodiments, the method supports unified synchronous and asynchronous cancelation by configuring 310 the program with both an invocation 216 of the add-to-cancelation-registry procedure 206 to register a synchronous operation and an invocation 216 of the add-to-cancelation-registry procedure 206 to register an asynchronous operation.

Some embodiments support group cancelation of operations in a single step. This may be accomplished, for example, by configuring 310 the program with an invocation 216 of the cancel-registered-items procedure 208, thereby allowing an attempted cancelation, by a single invocation, of at least all the cancelable items 130 that have been registered with the cancelation registry. In some embodiments, in addition to canceling all registered items, a call to the cancel-registered-items procedure 208 will result in cancelation (or at least attempted cancelation) of items 130 that are monitoring 312 the cancelation registry 214. For example, canceling 332 a registered I/O operation may result in cancelation of unregistered operations 224 that were requested by a thread that made the I/O request.

Configured Media

Some embodiments provide a storage medium configured with computer data and computer instructions, such as data 118 and instructions 116, for performing a method of guiding cancelation as discussed herein. The storage medium which is configured may be a memory 112, for example, and in particular may be a removable storage medium 114 such as a CD, DVD, or flash memory.

Some embodiments provide a storage medium 114 configured with computer data 118 and computer instructions 116 for unified and grouped cancelation of operations. The method includes registering 324 at least one synchronous operation with a cancelation registry 214 and registering 326 at least one asynchronous operation with the cancelation registry 214. In response to a single invocation 216 of a cancel-registered-items procedure 208, the method attempts to cancel 332 all of the operations that have been registered with the cancelation registry 214. These embodiments accordingly support unification of synchronous and asynchronous cancelation, as well as supporting grouped operations for one-step cancelation. Registration of operations with the cancelation registry 214 may be either implicit or explicit.

In some embodiments, the configured medium 114 provides a method that includes executing instructions for a registered cancelation operation to invoke 328 a callback 218 mechanism to notify a cancelation context 212 of a result 226 of attempting cancelation of the registered cancelation operation.

In some embodiments, the configured medium 114 provides a method wherein at least one of the registering steps 324, 326 implicitly registers an operation for cancelation, namely, registers the operation without using a program invocation 216 of an add-to-cancelation-registry procedure 206 which passes the operation as a parameter. That is, instead of an explicit call to register an operation (or another item 130), the method involves an ambient cancelation context 212 (or other ambient cancelation registry 214) which implicitly registers operations (and possibly other items 130) within its scope.

For example, a program call to file.Read might pass a cancelation context 212, whereby Read in effect implicitly registers itself with the context, since the program did not call CancelationContext.Add( ) to register Read.

As another example, in a program that includes an ambient CancelationContext a component 120 that MyApp uses might choose to register itself with that cancelation context 212. Consider a component with a method like the following:

```
void DoSomething( )
{
    var cc = CancelationContext.Current;
    cc.Add(DoSomethingInternal( ));
}
```

If MyApp then calls DoSomething, MyApp is internally registering operations with the cancelation context 212, so from MyApp's point of view as the caller of DoSomething, registration with the current cancelation context is implicit.

In some embodiments, the method further includes executing instructions to attempt to cancel 332 all registered operations and to give 334 an indication of at least one result 226 of the cancelation attempt, such as a status code, a return value, or even a failure to signal an error condition. For example, a result 226 could be indicated by setting the CancelationContext.IsCanceled flag and signaling CancelationContext.CancelationEvent. Notification of a cancelation attempt can take various forms. For example, a cancelation context 212 could give 334 notice that a cancelation request has been issued, such as:

```
bool CancelationRequested;
WaitHandle CancelationRequestedEvent;
```

A cancelation context 212 could give 334 notice that cancelation has been completed, meaning that all registered operations finished successfully or due to the cancelation, e.g.:

```
bool CancelationCompleted;
WaitHandle CancelationCompletedEvent;
```

In some embodiments, the method further includes executing instructions 116 to query a component 120 to determine whether the component has at least one operation that can be registered with a cancelation registry 214. For example, in one embodiment a client can query for ISupportsCancelation on either an EAP component that issues async operations or on the result of an individual APM asynchronous operation, as discussed earlier.

More generally, any of the method steps illustrated in FIG. 3, or otherwise taught herein, may be used to help configure a storage medium to thereby form a configured medium embodiment.

Conclusion

As described herein, some embodiments provide various tools and techniques to facilitate cancelation management during software development. Some embodiments provide a unified cancelation model that works for multiple cancelation methodologies, including synchronous and asynchronous operations. For example, some embodiments allow a developer to specify asynchronous cancelation support, e.g., by implementing ISupportsCancelation with a Cancel method; some embodiments allow a developer to specify synchronous cancelation support, e.g., by accepting a CancelationContext as an additional argument to a blocking operation. An embodiment may use a myriad of techniques for cancelation, like full fledged IO cancelation, or signaling an event that the blocking operation is waiting on, e.g., in a WaitAny with the original event it is also waiting on.

In some embodiments, cancelation registries 214 are associated with cancelable items 130 that may include specific cancelable operations or specific type instances. Some embodiments provide a group cancelation, whereby heterogeneous cancelable operations can be canceled in a single step by invoking a cancel-registered-items procedure 208; in some embodiments invoking cancelation in an outer scope automatically invokes cancelation within nested cancelation registry scopes.

Although particular embodiments are expressly illustrated and described herein as methods, configured media, or systems, it will be appreciated that discussion of one type of embodiment also generally extends to other embodiment types. For instance, the descriptions of methods in connection with FIG. 3 also help describe configured media, as well as the operation of systems like those described in connection with FIGS. 1 and 2. It does not follow that limitations from one embodiment are necessarily read into another. In particular, methods are not necessarily limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method which may be used by a software developer to configure cancelation of operations in a program, the method comprising the steps of:
    obtaining a cancelation registry which includes an add-to-cancelation-registry procedure for adding a cancelable item to a cancelation registry which is a registry as opposed to being a cancel function, and which also includes a cancel-registered-items procedure having upon an invocation a cancelation attempt functionality for attempting to cancel item(s) that are registered with the cancelation registry, the invocation of said cancelation attempt functionality not requiring that a thread identify an operation to be canceled and not requiring an argument comprising a thread identifier identifying the thread in which the operation is to be canceled; and
    configuring the program with an invocation of the add-to-cancelation-registry procedure, thereby allowing registration of a cancelable item in the cancelation registry.

2. The method of claim 1, wherein the method further comprises configuring the program for a cancelable item to monitor the cancelation registry without the cancelable item being registered in the cancelation registry, and configuring the program to cancel the cancelable item in response to cancelation of a different cancelable item which is registered in the cancelation registry.

3. The method of claim 1, wherein the method comprises configuring the program with at least one of the following: an invocation of the add-to-cancelation-registry procedure to register an item associated with a transaction framework;
    an invocation of the add-to-cancelation-registry procedure to register a transaction.

4. The method of claim 1, wherein the cancel-registered-items procedure is an asynchronous procedure, and the method further comprises configuring the program with an invocation of the asynchronous cancel-registered-items procedure.

5. The method of claim 1, wherein the cancel-registered-items procedure is a synchronous procedure, and the method further comprises configuring the program with an invocation of the synchronous cancel-registered-items procedure in coordination with a thread blocking operation.

6. The method of claim 1, wherein the method comprises configuring the program with (a) an invocation of the add-to-cancelation-registry procedure to register a synchronous operation, and also with (b) an invocation of the add-to-cancelation-registry procedure to register an asynchronous operation.

7. The method of claim 1, further comprising configuring the program with an invocation of the cancel-registered-items procedure, thereby allowing an attempted cancelation, by a single invocation, of at least all the cancelable items that have been registered with the cancelation registry.

8. A computer system configured for cancelation of registered operations, the system comprising:
    at least one memory configured with executable instructions of a program;
    at least one logical processor configured to execute at least a portion of the instructions;
    a cancelation interface configuring the memory, the cancelation interface including at least a cancel-registered-items procedure having upon an invocation a cancelation attempt functionality for attempting to cancel operation(s) that are registered with a cancelation registry which is a registry as opposed to being a cancel function, the invocation of said cancelation attempt functionality not requiring that a thread identify an operation to be canceled and not requiring an argument comprising a thread identifier identifying the thread in which the operation is to be canceled; and
    an invocation of the cancel-registered-items procedure within the program.

9. The system of claim 8, wherein the cancelation interface includes a remove-from-cancelation-registry procedure for ensuring that an operation is not registered in the cancelation registry.

10. The system of claim 8, further comprising an ambient cancelation registry which configures the memory.

11. The system of claim 8, further including the cancelation registry, and wherein the cancelation registry satisfies at least one of the following conditions: the cancelation registry follows program language scope rules, the cancelation registry is freeflowing within the program, the cancelation registry is stored in a thread's local memory, the cancelation registry is stored in a static variable, the cancelation registry is communicated via message passing.

12. The system of claim 8, wherein the cancelation interface is presented in the program by an interface definition.

13. The system of claim 8, further including a first cancelation registry configuring the memory and a second cancelation registry also configuring the memory, wherein the program includes a first context having a first cancel-registered-items procedure invocation for attempting to cancel a first group of operations that are registered with the first cancelation registry, the program also includes a second context having a second cancel-registered-items procedure invocation for attempting to cancel a second group of operations that are registered with the second cancelation registry, and at least one operation is registered in one of the cancelation registries but is not registered in the other cancelation registry.

14. The system of claim 8, wherein an invocation of an add-to-cancelation-registry procedure is configured to create a cancelation token within the program, and the instructions are configured to pass the cancelation token to each registered synchronous operation in response to an invocation of the cancel-registered-items procedure.

15. A storage medium configured with computer data and computer instructions for unified and grouped cancelation of operations, the method comprising the steps of:
   registering at least one synchronous operation with a cancelation registry which is a registry as opposed to being a cancel function;
   registering at least one asynchronous operation with the cancelation registry; and
   in response to a single invocation of a cancel-registered-items procedure having upon an invocation a cancelation attempt functionality for attempting to cancel operation(s) that are registered with the cancelation registry, attempting to cancel all of the operations that have been registered with the cancelation registry, the invocation of said cancelation attempt functionality not requiring that a thread identify an operation to be canceled and not requiring an argument comprising a thread identifier identifying the thread in which the operation is to be canceled.

16. The configured medium of claim 15, wherein the method comprises executing instructions for a registered cancelation operation to invoke a callback mechanism to notify a cancelation context of a result of attempting cancelation of the registered cancelation operation.

17. The configured medium of claim 15, wherein at least one of the registering steps implicitly registers an operation for cancelation, namely, registers the operation without using a program invocation of an add-to-cancelation-registry procedure which passes the operation as a parameter.

18. The configured medium of claim 15, wherein the method further comprises executing instructions to attempt to cancel all registered operations and to indicate at least one result of the attempt.

19. The configured medium of claim 15, wherein the method further comprises executing instructions to attempt to cancel at least one registered I/0 operation.

20. The configured medium of claim 15, wherein the method further comprises executing instructions to query a component to determine whether the component has at least one operation that can be registered with the cancelation registry.

\* \* \* \* \*